United States Patent [19]

Brown et al.

[11] Patent Number: 4,889,994

[45] Date of Patent: Dec. 26, 1989

[54] DETECTION OF ELECTROMAGNETIC RADIATION

[75] Inventors: Alfred R. Brown, Stanwell; Andrew D. Mackrell, Colnbrook, both of England

[73] Assignee: Graviner Limited, Essex, England

[21] Appl. No.: 142,454

[22] Filed: Jan. 7, 1988

[30] Foreign Application Priority Data

Jan. 7, 1987 [GB] United Kingdom ................ 8700232

[51] Int. Cl.$^4$ ............................................. H01J 47/02
[52] U.S. Cl. .................................. 250/374; 250/372; 250/375
[58] Field of Search ....................... 250/374, 375, 372; 340/600

[56] References Cited

U.S. PATENT DOCUMENTS

| 3,342,995 | 9/1967 | Axmark | 250/374 |
| 4,016,425 | 4/1977 | Farquhar et al. | 250/372 |
| 4,162,425 | 7/1979 | Larsen et al. | 250/372 |
| 4,414,542 | 11/1983 | Farquhar et al. | 340/600 |
| 4,736,105 | 4/1988 | Fonnesbeck | 250/372 |
| 4,765,413 | 8/1988 | Spector et al. | 250/372 |

FOREIGN PATENT DOCUMENTS 2126713 3/1984 United Kingdom ................ 340/600

Primary Examiner—Janice A. Howell
Assistant Examiner—William F. Rauchholz
Attorney, Agent, or Firm—Leydig, Voit & Mayer

[57] ABSTRACT

A system for detecting ultra-violet radiation has a cold cathode discharge tube which produces a pulse each time it avalanches. A logic arrangement steers these pulses successively to separate timers in that order. In response to each pulse, each timer sends its own output line HIGH for a preset period, the same for all the timers. An AND gate receives all the timer outputs and produces an alarm signal when all these are HIGH at the same time.

8 Claims, 2 Drawing Sheets

DETECTION OF ELECTROMAGNETIC RADIATION

BACKGROUND OF THE INVENTION

The invention relates to the detection of radiation. More specifically, it relates to the detection of ultra-violet ("UV") radiation.

BRIEF SUMMARY OF THE INVENTION

According to the invention, there is provided a method of detecting incident radiation using detecting means for that radiation whose response to it is at least in part random but with a predictable probability, comprising the steps of reacting to each response of the detecting means by defining a respective time period starting at the instant of that response, and producing an output indication when a predetermined plurality of consecutive said responses occur within a predetermined maximum time duration.

According to the invention, there is further provided a method of detecting incident UV radiation using a UV-responsive avalanching type detector, in which an output is produced indicating detection of the radiation only when a predetermined plurality of avalanches are detected as all occurring within a predetermined fixed length of time.

According to the invention, there is also provided a system for detecting radiation using detecting means for that radiation whose response to it is at least in part random but with a predictable probability, comprising means operative at each response of the detecting means to define a respective time period starting at the instant of that response, and output means operative to produce an output when a predetermined plurality of consecutive said responses occur within a predetermined maximum time duration.

According to the invention, there is still further provided a system for detecting UV radiation using a cold cathode discharge tube, comprising timing means operative in response to successive avalanches of the tube to initiate respective time periods all of the same predetermined length and each starting at the instant of the respective avalanche, and output means operative to produce an output when a predetermined plurality of the avalanches occur within any said time period.

DESCRIPTION OF THE DRAWINGS

UV radiation detection arrangements embodying the invention, and methods of UV radiation detection according to the invention, will now be described, by way of example only, with reference to the accompanying diagrammatic drawings in which.

DESCRIPTION OF PREFERRED EMBODIMENTS

The arrangements to be described are for use in detecting UV radiation and use a cold cathode gas-discharge tube as the radiation detector.

Such a tube has an anode and a cathode across which a suitable potential difference is applied. Provided that this potential difference is sufficient (that is, provided that it is at least equal to the "striking voltage", $V_s$) then, in the presence of incident radiation of the correct wavelength and after a time lag, $t_s$, the tube will "avalanche", that is, a gas discharge will occur. Such discharge occurs by virtue of the fact that electrons emitted from the cathode by the incident UV radiation trigger a pulse of current in the tube. The time lag $t_s$, which may be several minutes, is referred to as the "statistical time lag" and depends (for the particular tube) on the intensity and wavelength bandwidth of the incident radiation. In response to a steady level of radiation, it can be shown that the time delay (the statistical time lag) between the application of the radiation and the occurrence of the current pulse conforms to Poisson statistics. The statistical nature of the process is due to the statistical fluctuations in the physical processes of emission and ionisation in the tubes.

The striking voltage $V_s$ can be defined as that voltage at which the probability of the tube avalanching to produce a current greater than one microamp (due to the release of the electrons from the cathode and the subsequent ionisation of the gas under the field effect) goes from zero to a finite value. In other words, when the probability has such a finite value, it follows that if a voltage V is added to $V_s$, where V is very small, then, after time $t_s$ a gas discharge will occur. As V is increased, the probability increases and consequently $t_s$ falls (for a given UV radiation stimulus).

In normal operation, such a tube is operated by switching the applied potential difference off (or reducing it well below $V_b$, the "burning voltage") immediately after each current pulse has been produced and detected, so as to allow the tube to restore itself to its initial conditions. This requires a finite recovery time. After this a voltage at least as great as and preferably greater than the striking voltage $V_s$ is re-applied, so as to produce a fresh current pulse after the statistical time lag. $V_b$, the burning voltage, is the voltage which is at least necessary across the tube to maintain it conducting once it has started to conduct.

The arrangements to be described take account of the statistical nature of the response of the tube.

Figure 1:
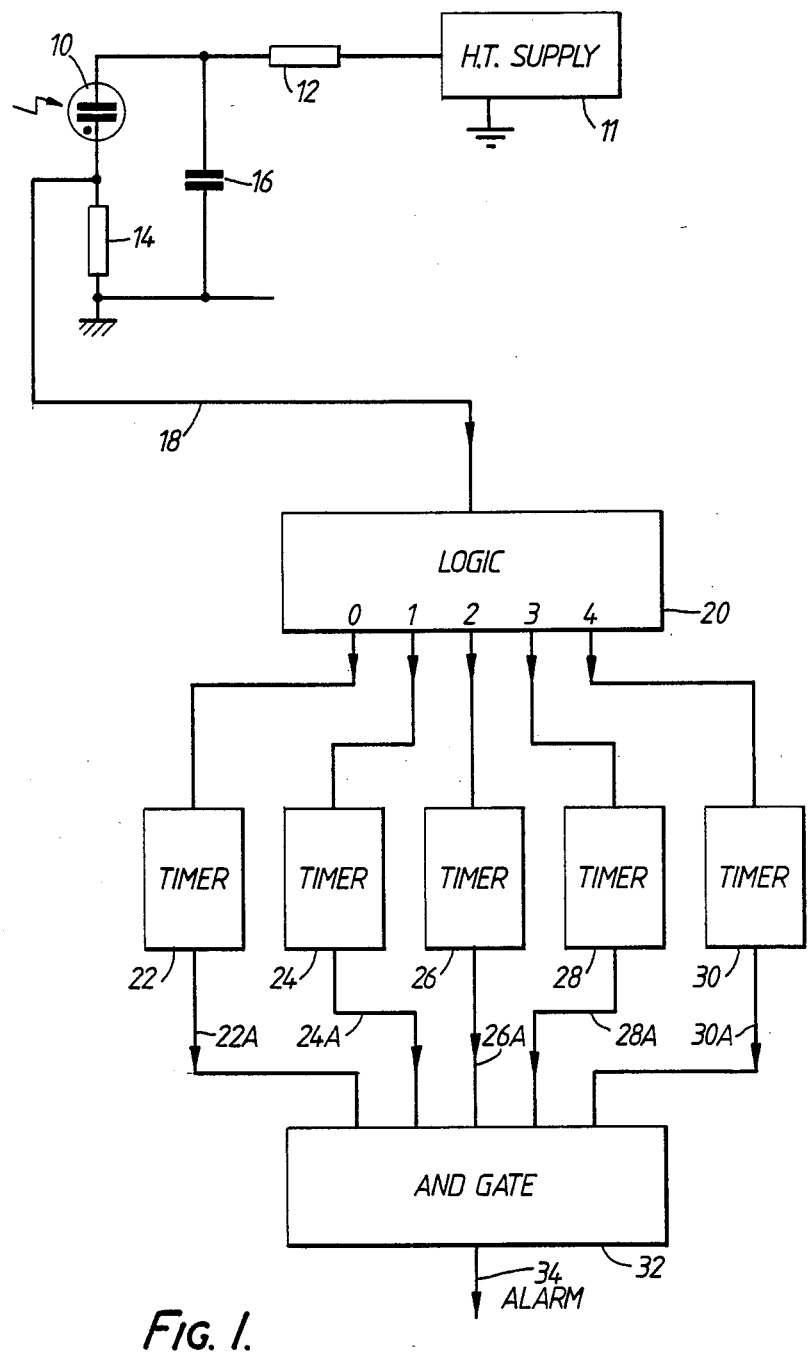
FIG. 1 is a block circuit diagram of one of the arrangements.

As shown in FIG. 1, the cold cathode gas discharge tube 10 is connected across a suitable HT power supply 11 via a resistor 12 and a resistor 14, and in parallel with a capacitor 16.

Assuming that the tube 10 is not conducting, capacitor 16 is charged through resistor 12 to a voltage exceeding $V_s$. If the tube 10 now discharges (that is, a current pulse occurs) due to UV radiation in the manner explained, the conduction of tube 10 discharges capacitor 16 through resistor 14 faster than it can be recharged by the supply 11 through resistor 12. This discharge of capacitor 16 causes the potential across the tube 10 to fall. When it falls below the burning voltage ($V_b$) of the tube 10, the tube ceases to conduct.

The current pulse produced by conduction of the tube produces an output voltage pulse across resistor 14 which is fed on a line 18 to the remainder of the circuit, to be described below.

When the tube 10 ceases to conduct, capacitor 16 starts to recharge with a time constant RC, where R is the resistance of resistor 12 and capacitance C is the capacitance of capacitance 16. The tube cannot re-conduct before the voltage across capacitor 16 has once more exceeded $V_s$. The time taken for capacitor 16 to recharge from $V_b$ to $V_s$ determines the recovery time which the tube 10 is allowed.

Line 18 is connected to the input of steering logic 20 having five outputs, "0", "1", "2", "3", and "4". The steering logic 20 responds to the pulses received on line 18 by outputting them on the five output lines in the sequential order "0","1","2","3","4","0","1","2"... and so on.

The five outputs of the steering logic 20 are respectively connected to five timer units 22,24,26,28 and 30 each of which has a respective output line 22A,24A,26A,28A and 30A. When each timer receives a pulse from the respective output line of the steering logic 20, it sends its own output line HIGH for a preset period, $T_g$ (which is the same for all the timers). The output lines of all the timers are connected to an AND gate 32. When all the inputs to the AND gate 32 are HIGH at the same time, it produces an alarm output on a line 34.

The operation of the arrangement of FIG. 1 will now be described with reference to FIGS. 2 and 3.

Figure 2:
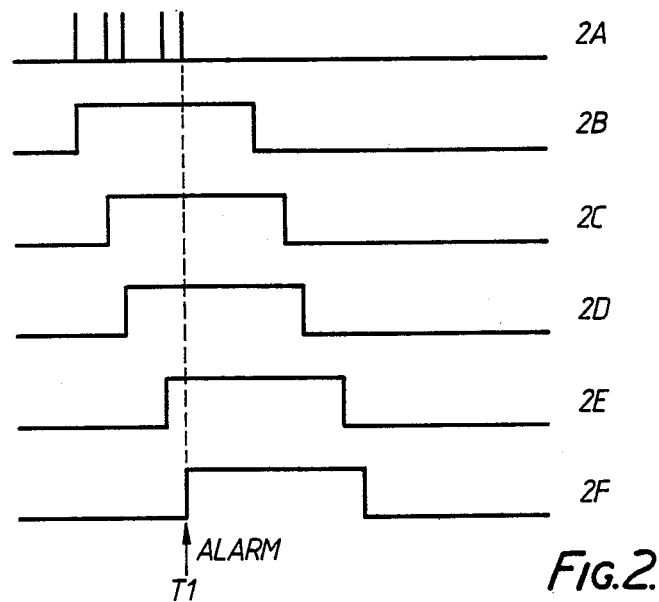
FIGS. 2 and 3 show waveforms for explaining the operation of the arrangement of FIG. 1.

FIG. 2 illustrates the operation of the arrangement in a situation in which a sudden and relatively intense UV radiation-producing event occurs, such as an explosion. It is assumed that this produces five output pulses on line 18, in rapid succession as shown in waveform 2A. Due to statistical fluctuations, these five pulses will not occur at exactly regular intervals. In the manner explained, the steering logic 20 will direct the incoming pulses to respective ones of its five output lines, in sequence, and the five timers will thus be sequentially activated. The outputs on the output lines 22A,24A,26A,28A and 30A are illustrated respectively in waveforms 2B,2C,2D,2E and 2F.

It will be apparent that at a time instant T1 the AND gate 32 is receiving five HIGH inputs and it therefore produces an alarm on its output line 34.

Figure 3:
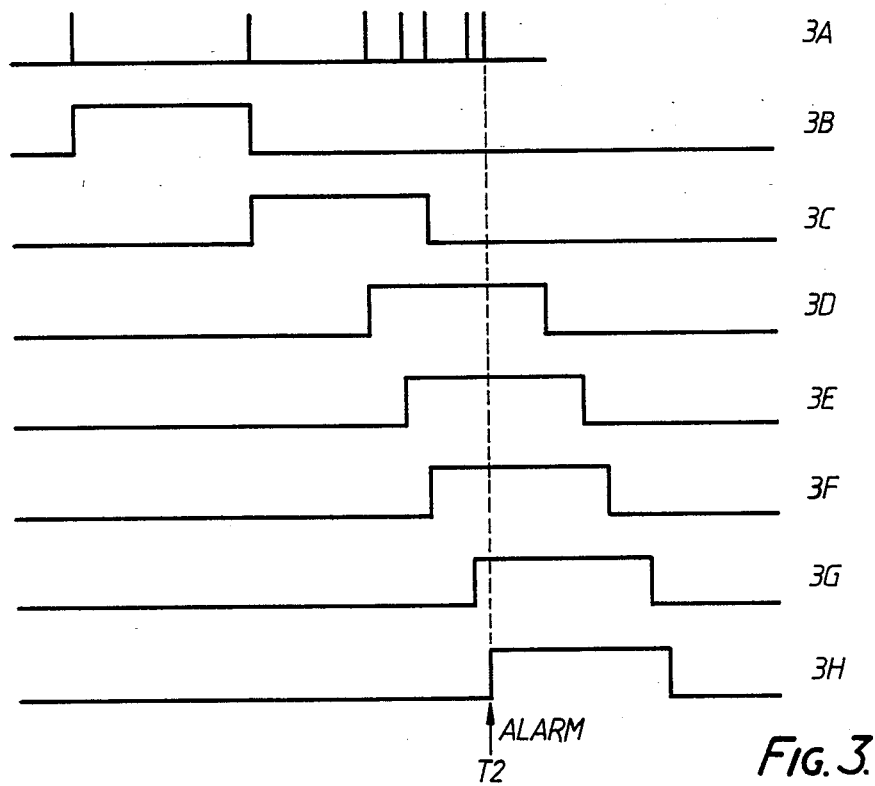

FIG. 3 illustrates the operation of the circuit where the intensity of the radiation received by the tube is increasing. Thus, for example, this illustrates the situation in which the distance between a source of radiation and the discharge tube is decreasing as for example occurs when a rocket or missile is approaching the detection source. As shown in waveform 3A, therefore, the time separation between the successive pulses occurring on line 18 decreases.

Seven such pulses are shown as occurring in waveform 3A, and the steering logic 20 directs these to the "0","1","2","3","4","0"and "1" output lines, respectively, of the steering logic 20. Therefore, as illustrated in waveforms 3B to 3H respectively, the outputs of the corresponding timers go HIGH.

As is apparent, however, the five inputs of the AND gate 32 are not all at HIGH until time T2. This is because it is not until time T2 that the pulses on line 18 are occurring sufficiently close together for five of them all to occur within a time less than $T_g$. The first two pulses occurring in waveform 3A are therefore discounted.

From the foregoing, it will be apparent that the circuit arrangement described initially waits for incident UV radiation of sufficient intensity to trigger the tube. If such triggering does occur, the circuit arrangement effectively establishes a time perod $T_g$ and then detects whether four further pulses occur within that time period. Only if four such further pulses do occur within that time period is an alarm produced. However, the circuit arrangement re-starts the time measuring and pulse detection process in response to each arriving pulse and therefore produces an alarm output as soon as five consecutive pulses have occurred within a time period $T_g$ measured from the first of those five.

The arrangement described and illustrated with reference to FIGS. 1 to 3 is advantageous over prior arrangements in which a predetermined sequence of fixed time periods is initiated in response to the first pulse sensed and a warning output is produced only when a pulse is also detected in each other one of the time periods. The arrangement described and illustrated with reference to FIGS. 1 to 3 is able to respond much more rapidly, particularly to high intensity radiation, because the successive time periods which it employs can overlap in the manner described whereas this is not possible with the prior arrangement.

What is claimed is:

1. A method of detecting incident radiation using detecting means for that radiation whose response to it is at least in part random but with a predictable probability, comprising the steps of reacting to each response of the detecting means by defining a respective time period starting at the instant of that response whether or not any preceding said time period has ended, all the said time periods being equal in length, and producing an output indication, indicating detection of the said radiation, as soon as a predetermined plurality of said time periods are detected as running simultaneously.

2. A method according to claim 1, in which the radiation is UV radiation and the detecting means is a cold cathode gas discharge tube and each said response is the production of a current pulse therein as a result of discharge of the tube.

3. A method of detecting incident UV radiation using a UV-responsive avalanching type detector, comprising the steps of detecting each said avalanche, and producing an output indicating detection of the radiation only when a predetermined plurality of said avalanches are detected as all occurring within the same predetermined fixed length of time which begins at the instant of occurrence of the first of said plurality of avalanches.

4. A system for detecting radiation using detecting means for that radiation whose response to it is at least in part random but with a predictable probability, comprising means operative at each response of the detecting means to define a respective time period starting at the instant of that response, each said time period being of the same length, and output means operative to produce an ouput, indicating detection of the said radiation, as soon as a predetermined plurality of said time periods are detected as running simultaneously.

5. A system according to claim 4, in which the means operative at each response of the detecting means to initiate a respective time period comprises a plurality of timing means each operative when activated to produce an output persisting for the length of a said time period and means reacting to each response of the detecting means to activate the timing means sequentially, and in which the output means comprises a coincidence gate connected to receive the outputs of all of the timing means.

6. A system according to claim 4, in which the radiation is UV radiation and the detecting means is a cold cathode gas discharge tube and each said response is the production of a current pulse therein as a result of discharge of the said tube.

7. A system for detecting UV radiation using a cold cathode discharge tube, comprising
  timing means operative in response to each successive avalanche of the tube to define a respective time period, all the said time periods being equal in length and each starting at the instant of the respective avalanche, and
  output means operative to produce an output, indicating detection of the said UV radiation, as soon as a predetermined plurality of said time periods are detected as running simultaneously.

8. A system according to claim 7, in which the timing means comprises
  a plurality of separate timers each operative when activated to produce a signal persisting for the length of the respective time period and
  logic means responsive to successive avalanches of the tube to activate the timing means sequentially, and
  in which the output means comprises a coincidence gate connected to receive the said signals.

* * * * *